(12) United States Patent  
Kalix et al.

(10) Patent No.: US 6,938,477 B2  
(45) Date of Patent: Sep. 6, 2005

(54) SOLID STATE ILLUMINATOR FOR BI-COLORED PORTED WATER LEVEL GAUGES

(75) Inventors: David Kalix, Dartmouth (CA); John Spencer, Dartmouth (CA)

(73) Assignee: Fossil Steam Technologies Inc., Dartmouth (CA)

( * ) Notice: Subject to any disclaimer, the term of this patent is extended or adjusted under 35 U.S.C. 154(b) by 0 days.

(21) Appl. No.: 10/487,868

(22) PCT Filed: Nov. 3, 2003

(86) PCT No.: PCT/CA03/01684

§ 371 (c)(1),  
(2), (4) Date: Feb. 26, 2004

(87) PCT Pub. No.: WO2004/042332

PCT Pub. Date: May 21, 2004

(65) Prior Publication Data

US 2005/0092082 A1     May 5, 2005

(30) Foreign Application Priority Data

Nov. 4, 2002     (CA) .................................. 2410978

(51) Int. Cl.[7] .......................... G01F 23/00; G01F 23/02
(52) U.S. Cl. ......................................... 73/293; 73/328
(58) Field of Search .......................... 73/313, 314, 293, 73/326–330

(56) References Cited

U.S. PATENT DOCUMENTS

| | | | |
|---|---|---|---|
| 2,024,815 A | 12/1935 | Blackburn | 73/293 |
| 2,115,889 A | 5/1938 | Steimel | 330/3 |
| 2,510,729 A | 6/1950 | Van Ham | 73/330 |
| 3,119,268 A | 1/1964 | Stanley | 73/331 |
| 4,450,722 A | 5/1984 | Keyes, IV et al. | 73/293 |
| 4,733,335 A | 3/1988 | Serizawa et al. | 362/503 |
| 4,813,759 A | 3/1989 | Chappell | 340/531 |
| 4,836,022 A | 6/1989 | Zhang | 73/293 |
| 4,877,668 A | 10/1989 | Hinz et al. | 428/68 |
| 5,072,616 A | 12/1991 | Sherrick | 73/293 |
| 6,043,505 A | 3/2000 | Ames et al. | 250/577 |

FOREIGN PATENT DOCUMENTS

| | | | | |
|---|---|---|---|---|
| CA | 1 250 462 | 2/1989 | | |
| CA | 2 186 805 | 6/1997 | | |
| DE | 32 29 125 | 3/1990 | | |
| DE | 198 00 770 | 12/1998 | | |
| JP | 62044630 | 2/1987 | | |
| JP | 2003172651 A | * | 6/2003 | G01F 23/02 |

* cited by examiner

*Primary Examiner*—Hezron Williams  
*Assistant Examiner*—Tamiko Bellamy  
(74) *Attorney, Agent, or Firm*—Jacobson Holman PLLC

(57) ABSTRACT

A solid state illuminator and display means are provided for bi-colored ported water level gauges suitable for use in high pressure steam drums or similar water/steam devices to facilitate making an accurate determination of water level in such a device. The illuminator comprises an array of bi-colored solid state light emitting diodes (LEDs), as the light source, and a precision lens to focus the light provided from the LEDs through a gauge body and onto the view screen.

10 Claims, 5 Drawing Sheets

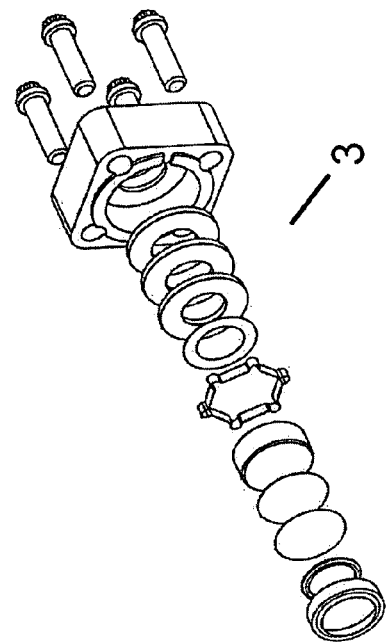
Figure 1b - Prior art
Figure 1c - Prior art
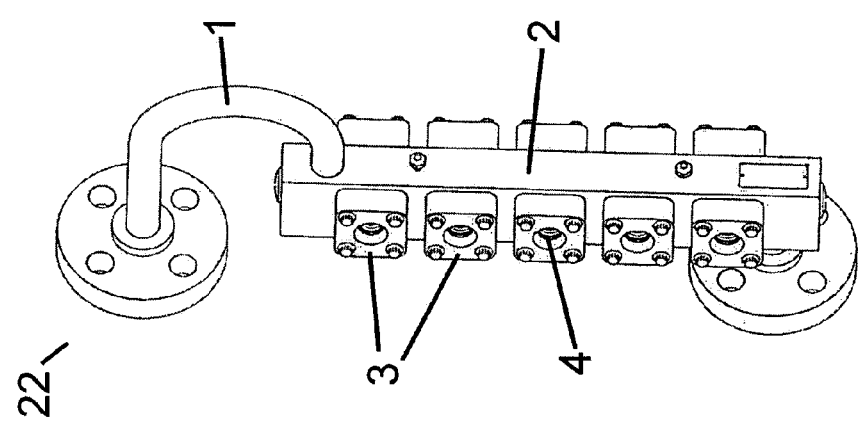
Figure 1a - Prior art

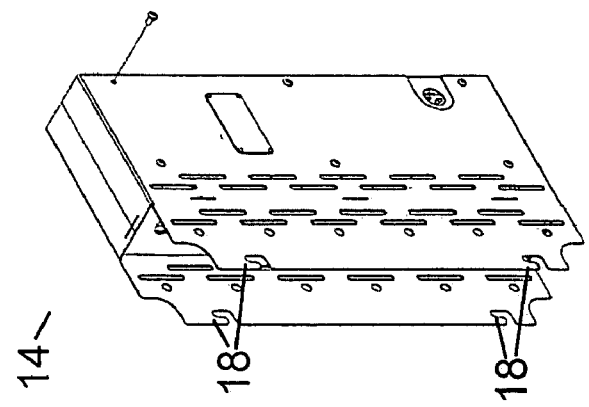
Figure 2c
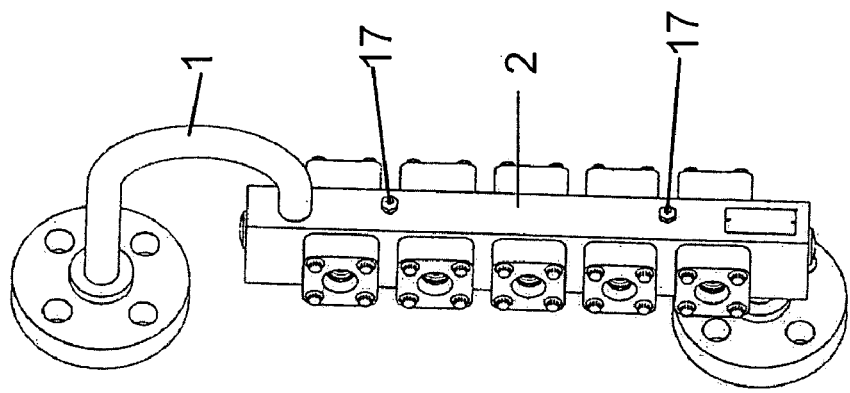
Figure 2b - Prior Art
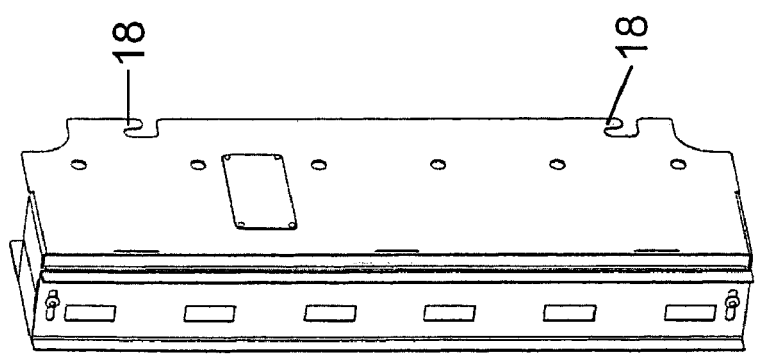
Figure 2a

Figure 3a
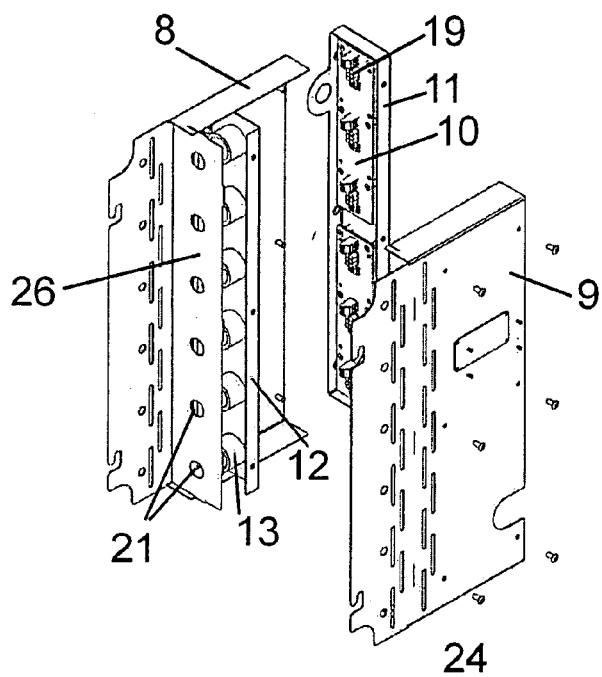
Figure 3b
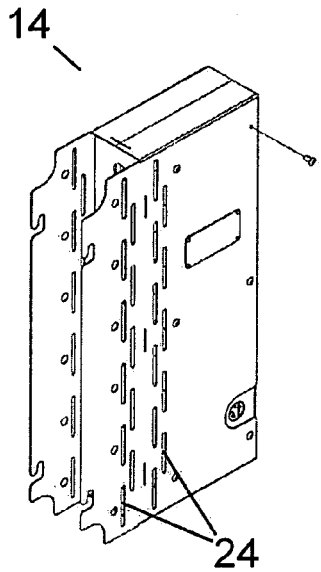
Figure 3c    Figure 3d    Figure 3e
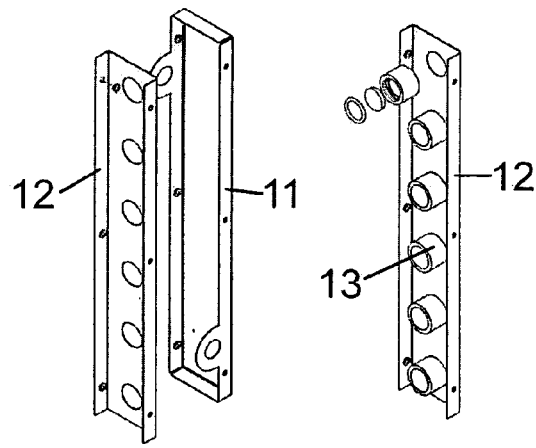
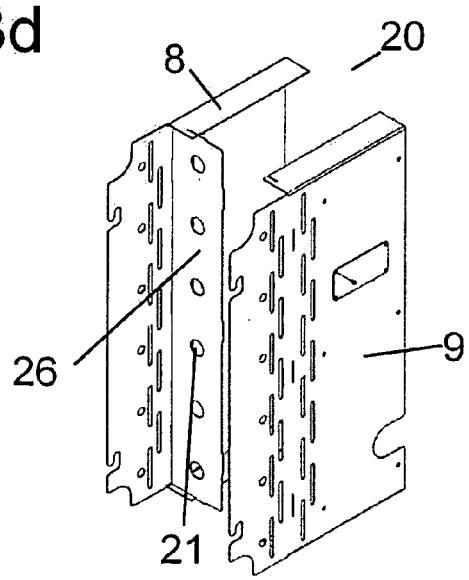

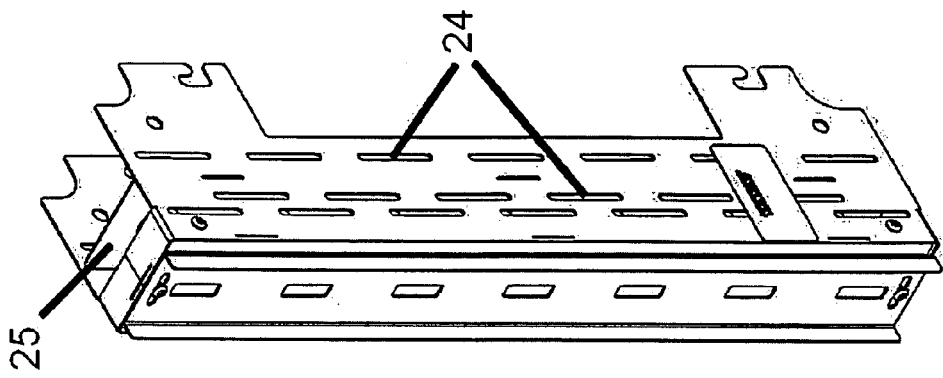
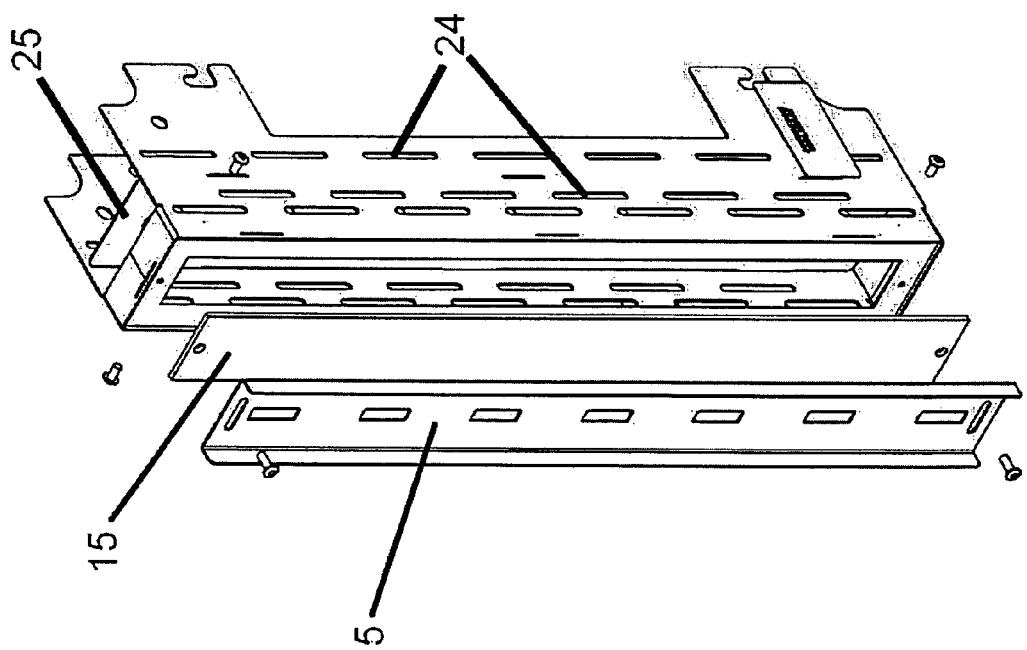

SOLID STATE ILLUMINATOR FOR BI-COLORED PORTED WATER LEVEL GAUGES

CROSS REFERENCE TO RELATED ART

This application is a national stage entry of PCT/CA03/01684 Nov. 03, 2003.

FIELD OF THE INVENTION

The present invention relates, generally, to a device for accurate determination of water level in a high pressure boiler drum or other similar water/steam apparatus. More specifically, the present invention utilizes an array of vertically arranged, bi-coloured, solid state light emitting diodes (LEDs) to provide light that is focussed through an array of precision lens and projected though either steam or water and displayed upon a view screen. The presence of either steam or water at a level corresponding to each LED in the array of LEDs will result in a clear and unmistakable colour change observable on the view screen.

BACKGROUND OF THE INVENTION

The design and use of bi-coloured light for determining water levels in steam boilers is well taught and documented in the art. Traditionally, incandescent light is passed through coloured lenses as the light source. These designs suffer from numerous deficiencies in their fragility, efficiency, power requirements and life span. An incandescent light source utilizes a fragile filament operating at high temperature. This filament can easily become damaged and break when subjected to continued vibration. In addition, the high operating temperature of the filament limits the life span of the incandescent light. The same incandescent light source requires a high level of power to operate and only a small percentage of this power is converted to usable light. The remaining power is lost, predominantly as heat.

Numerous liquid level indicators can be found in the art to which the present invention provides advances. U.S. Pat. No. 2,510,729 describes an indicating gauge in which a vertical column containing both water and steam includes a multitude of bores which pass horizontally through the column and allow for visual inspection of the contents of the column present at the corresponding level. An operator is able to inspect and determine the level at which the contents of the column shift from water to steam.

In U.S. Pat. Nos. 2,024,815 and 2,115,889, indicators that utilize the reflective and refractive properties of water, steam and light are revealed. In each case, the operator inspects the individual gauges within a plurality of gauges and is able to determine the water/steam level by observing a colour change associated with the level corresponding to the change from water to steam. The device of U.S. Pat. No. 2,115,889 provides an additional means to visually inspect the gauge at a greater distance, more specifically, at a position located far below the gauge. The light is provided in each of these devices via an incandescent light source.

U.S. Pat. No. 4,836,022 describes a bi-colour fluviograph for use in steam boilers and provides improvement to the intensity of light provided from the light source and includes benefits aimed at reducing the frequency of maintenance of the fluviograph. The light is provided by a flourescent lamp and the colours are introduced via a two planes, one painted red, and the other green. The fluviograph increases the intensity of the red light to allow for its operation in murky or turbulent water conditions that would render most previous devices inoperable. A further advantage is that the device need not be cleaned as frequently. Traditionally, the impurities in the water contained within the boiler would deposit on the lens and gradually reduce the effective light transmitted. This effect is lessened by increasing the light intensity.

SUMMARY OF THE INVENTION

The present invention provides a gauge system that incorporates a solid state illuminator and corresponding view screen, which can help accurately determine the water level in steam boilers or similar devices, and do so in a safe, economical, and efficient manner.

The use of light emitting diodes as a light source in a level gauge illuminator provides reduced operating costs in that much or virtually all power is converted to visible light. In addition, the nominal life of an LED is 100,000 hours. An LED is unaffected by continued vibration. An LED is capable of producing red and green light directly, eliminating the need for coloured glass. Finally, an LED requires minimal power to operate and the use of a solid state illuminator would be intrinsically safe in a hazardous environment.

According to an aspect of the present invention, there is provided a bi-colour ported water level gauge for use in determining the water level in a steam/water environment, for instance in a boiler steam drum comprising: an electronic printed circuit board containing an array of high-intensity, narrow beam, red/green light emitting diodes; the electronic printed circuit board being mounted on an electronics divider board; a divider board comprising a plurality of viewing ports, said ports being individually aligned with the light emitting diodes, and preferably substantially equal in number thereto; a heat divider for protecting the printed circuit board from high temperatures existing at an external housing comprising rows of offset slots to reduce heat transmission; and display means, such as a view screen, onto which light originating from the light emitting diodes is projected for inspection by an operator.

According to another aspect of the present invention, there is provided a bi-colour ported water level gauge illuminator for use in determining the water level in a steam/water environment, for instance in a boiler steam drum comprising: an electronic printed circuit board containing an array of high-intensity, narrow beam, red/green light emitting diodes; the electronic printed circuit board being mounted on an electronics divider board; a divider board comprising a plurality of viewing ports, said ports being individually aligned with the light emitting diodes, and preferably substantially equal in number thereto; and a heat divider for protecting the printed circuit board from high temperatures existing at an external housing comprising rows of offset slots to reduce heat transmission.

According to an aspect of the present invention, there is provided a bi-colour ported water level gauge for use in determining the water level in a steam/water environment, for instance in a boiler steam drum comprising: an electronic printed circuit board containing an array of high-intensity, narrow beam, red/green light emitting diodes; the electronic printed circuit board being mounted on an electronics divider board; a lens divider board comprising a plurality of viewing ports, each containing means, such as a plano-convex lens, for focussing light originating from the light emitting diodes, said ports being individually aligned with the light emitting diodes, and preferably substantially equal in number thereto; a heat divider for protecting the printed circuit board from high temperatures existing at an external housing comprising rows of offset slots to reduce heat transmission; and display means, such as a view screen, onto which light originating from the light emitting diodes is projected for inspection by an operator.

According to another aspect of the present invention, there is provided a bi-colour ported water level gauge illuminator for use in determining the water level in a steam/water environment, for instance in a boiler steam drum comprising: an electronic printed circuit board containing an array of high-intensity, narrow beam, red/green light emitting diodes; the electronic printed circuit board being mounted on an electronics divider board; a lense divider board comprising a plurality of viewing ports, each containing means, such as a plano-convex lense, for focussing light originating from the light emitting diodes, said ports being individually aligned with the light emitting diodes, and preferably substantially equal in number thereto; and a heat divider for protecting the printed circuit board from high temperatures existing at an external housing comprising rows of offset slots to reduce heat transmission.

A further aspect of the invention provides a method for determining the water level in a boiler steam heater, or similar water/steam device characterized by the steps of: projecting a first light from one or more light emitting diodes of a first colour; projecting a second light from one or more light emitting diodes of a second colour; passing said first and second lights though a column containing steam and water at a varying level onto a projection screen positioned on an opposing side of said column relative to said light emitting diodes; observing the position of the first and second light on the projection screen at varying vertical levels along the column; and determining the presence of water or steam at each of said varying vertical levels based upon the observed positions of the first and second lights on the projection screen.

BRIEF DESCRIPTION OF THE DRAWINGS

FIG. 1a is a perspective view of a conventional water level gauge, demonstrating a vertical array of viewing ports;

FIG. 1b is a perspective view of an individual port;

FIG. 1c is a exploded, perspective view of an individual port;

FIGS. 2a, 2b, and 2c constitute a perspective view of a system according to an embodiment of the present invention including the component parts from left to right: namely a level display, a level gauge, and an illuminator;

FIG. 3a is an exploded, perspective view of an illuminator according to an embodiment of the present invention;

FIG. 3b is a completed, perspective view of the illuminator of FIG. 3a;

FIG. 3c is an exploded, perspective view of an electronics divider board, and a lens divider board according to an embodiment of the present invention;

FIG. 3d is a perspective view of the lens divider board of FIG. 3c, including an array of lenses, one lens of which if presented in an exploded view;

FIG. 3e is an exploded perspective view of external housing of the illuminator according to an embodiment of the present invention;

FIG. 5 is an exploded, perspective view of a level display according to a second embodiment of the present invention; and FIG. 6 is a completed, perspective view of the level display of FIG. 5.

DETAILED DESCRIPTION OF THE INVENTION

Figure 4C:
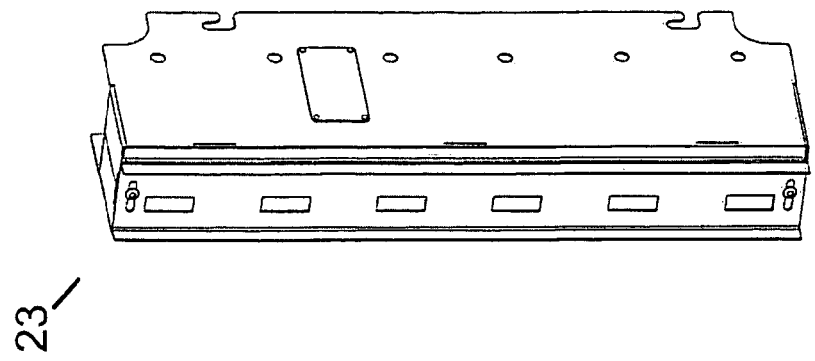
FIG. 4c is a completed, perspective view of the level display of FIG. 4b.

The system of the present invention comprises two main components: an illuminator, and a level display.

These two main components interact with a conventional water level gauge 22 as can be seen in FIG. 1A. A conventional water level gauge 22 is made up of a series of ports 3, arranged vertically along a column 2, each comprising an opening 4 protected by glass, though which light may pass. When installed on a water boiler, or similar device, water or steam or a combination of the two will pass from the boiler, through the pipe 1, and into the column 2. An operator, who wishes to inspect the column 2 may peer through the series of ports 3, and determine the level of water within the gauge, and correspondingly, the boiler.

As can be seen in FIGS. 2a, 2b, and 2c, an illuminator 14 and level display 23 interact with a level gauge 22 by an interface that is formed between hooks 18 on the outer housings of the illuminator and the level display and a bolt 17 on the column 2 of the level gauge.

Referring to FIGS. 3a–3e, the illuminator may comprise an electronic printed circuit board (PCB) 10 containing an array of red and green light emitting diodes (LEDs) 19, an array of plano-convex lenses 13, equal in number to the number of LEDs 19, and an external housing 20, made up of a first portion 8 and a second portion 9, adapted for attachment to a conventional water level gauge. The PCB 10 utilizes precision resistors to regulate the current supplied to each LED 19. The PCB further utilizes a terminal block corresponding to each LED 19 that provides a connection point for the input power and allows for jumpering between individual PCBs 10. The PCB 10 is mounted on an electronics divider 11 which is, in turn, attached to the first portion 8 and second portion 9 of the external housing. A lens divider board 12 is positioned adjacent to the array of LEDs 19, and is attached to the first and second portions 8,9 of the outer housing. This lens divider board 12, has a number of plano-convex lenses 13, equal to the number of LEDs 19 present on the PCB 10. These lenses 13 focus light through an equal number of holes 21 in a heat divider 26 on the first portion 8 of the external housing so as to provide light to be passed through a level gauge.

The first and second portions 8,9 of the illuminator further comprise an array of offset slots 24 extending substantially completely from top to bottom. These slots 24 are designed and offset to limit the transmission of heat originating in the level gauge. The typical operating environment of a level gauge for a steam boiler is very high, typically in the range of 696 degrees F. (369 degrees Celsius). By introducing these slots to the design, heat transmission by conduction from the level gauge to the PCB board assembly and the LEDs is reduced, and the LEDs are isolated from these high operating temperatures.

Figure 4B:
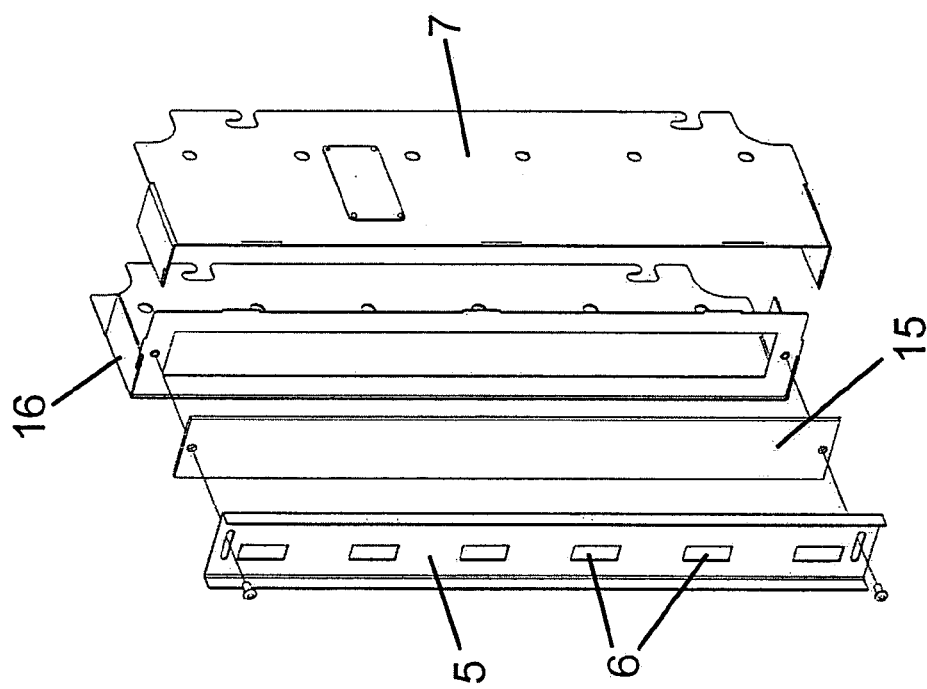
FIG. 4b is an exploded, perspective view of a level display according to an embodiment of the present invention.
Figure 4A:
FIG. 4a is a perspective view of an inner display end plate according to an embodiment of the present invention.

Referring now to FIGS. 4a, 4b, and 4c, the level display 23 may comprise a viewing screen 15 for viewing the light transmitted from the LEDs, having passed through a conventional water level gauge, an adjustable end plate 5 for blocking the unused red and green images, and a first portion 16 and second portion 7 of an external housing adapted for attachment to a conventional water level gauge. An adjustable end plate 5 provides openings 6 at the levels of concern and blocks the display of unwanted red and green light. The adjustable end plate 5 ensures that the operator can clearly distinguish between the levels and reduces error.

Referring now to FIGS. 5, and 6, a second heat divider 25 is provided for reducing the transmission of heat from the level gauge 22 to the view screen 15. Additionally, an array of offset slots 24 extends substantially completely from top to bottom of the level display 23. These slots 24 are designed and offset to limit the transmission of excess heat originating in the level gauge 22, which may impair the functionality of the display.

INDUSTRIAL APPLICABILITY

The bi-colour water level gauge and illuminator device taught herein generally provides an improved means for determining the water level in a boiler steam drum, heater, or similar water/steam device.

What is claimed is:

1. A bi-colour water level gauge for use in determining the water level in a boiler steam drum, heater, or similar water/steam device characterized by:
    an electronic printed circuit board (10) containing an array of high-intensity narrow beam first colour and second colour light emitting diodes (19); said electronic printed circuit board (10) being mounted on an electronics divider board (11);
    a lens divider board (12) comprising a plurality of viewing ports, each of said ports containing means, such as a plano-convex lens (13), for focussing light originating from said light emitting diodes (19), said ports being equal in number to, and aligned with said light emitting diodes (19);
    a heat divider (26) for separating said printed circuit board (10) from exposure to high temperatures existing at an external housing; and
    a display means (15) onto which light originating from the light emitting diodes (19) is projected for inspection by an operator.

2. A bi-colour water level gauge for use in determining the water level in a boiler steam drum, heater, or similar water/steam device characterized by:
    an electronic printed circuit board (10) containing an array of high-intensity narrow beam first colour and second colour light emitting diodes (19); said electronic printed circuit board (10) being mounted on an electronics divider board (11);
    a divider board (12) comprising a plurality of ports aligned with said light emitting diodes (19);
    a heat divider (26) for separating said printed circuit board (10) from high temperatures existing at an external housing; and
    a display means (15) onto which light originating from the light emitting diodes (19) is projected for inspection by an operator.

3. A bi-colour water level gauge illuminator for use in determining the water level in a boiler steam drum characterized by:
    an electronic printed circuit board (10) containing an array of high-intensity narrow beam first colour and second colour light emitting diodes (19); said electronic printed circuit board (10) being mounted on an electronics divider board (11);
    a lens divider board (12) comprising a plurality of ports, each of said ports containing means, such as a plano-convex lens (13), for focussing light originating from said light emitting diodes (19), equal in number to, and aligned with said light emitting diodes (19); and
    a heat divider (26) for separating said printed circuit board (10) from high temperatures existing at an external housing.

4. A bi-colour water level gauge illuminator for use in determining the water level in a boiler steam drum characterized by:
    an electronic printed circuit board (10) containing an array of high-intensity narrow beam first colour and second colour light emitting diodes (19); said electronic printed circuit board (10) being mounted on an electronics divider board (11);
    a divider board (12) comprising a plurality of ports aligned with said light emitting diodes (19); and
    a heat divider (26) for separating said printed circuit board (10) from high temperatures existing at an external housing.

5. A bi-colour water level gauge for use in determining the water level in a boiler steam drum, heater, or similar water/steam device according to claim 1, wherein said array of high-intensity narrow beam first colour and second colour light emitting diodes (19) comprises at least two light emitting diodes of said first colour arranged in parallel for independent operation and at least two light emitting diodes of said second colour arranged in parallel for independent operation.

6. A bi-colour water level gauge illuminator according to claim 3, wherein said array of high-intensity narrow beam first colour and second colour light emitting diodes (19) comprises at least two light emitting diodes of said first colour arranged in parallel for independent operation and at least two light emitting diodes of said second colour arranged in parallel for independent operation.

7. A bi-colour water level gauge for use in determining the water level in a boiler steam drum, heater, or similar water/steam device according to claim 1, wherein said first colour is red.

8. A bi-colour water level gauge for use in determining the water level in a boiler steam drum, heater, or similar water/steam device according to claim 1, wherein said second colour is green.

9. A bi-colour water level gauge illuminator for use in determining the water level in a boiler steam drum, heater, or similar water/steam device according to claim 3, wherein said first colour is red.

10. A bi-colour water level gauge illuminator for use in determining the water level in a boiler steam drum, heater, or similar water/steam device according to claim 3 wherein said second colour is green.

* * * * *